(12) United States Patent
Puskas et al.

(10) Patent No.: US 10,113,675 B2
(45) Date of Patent: Oct. 30, 2018

(54) DEVICE FOR CONNECTING TWO FLUID-CONDUCTING LINES

(71) Applicant: EUGEN FORSCHNER GMBH, Spaichingen (DE)

(72) Inventors: Ludwig Puskas, Spaichingen (DE); Thomas Chaloupka, Spaichingen (DE)

(73) Assignee: Eugen Forschner GMBH, Spaichingen (DE)

( * ) Notice: Subject to any disclaimer, the term of this patent is extended or adjusted under 35 U.S.C. 154(b) by 620 days.

(21) Appl. No.: 14/428,309

(22) PCT Filed: Sep. 12, 2013

(86) PCT No.: PCT/EP2013/068959
§ 371 (c)(1),
(2) Date: Mar. 13, 2015

(87) PCT Pub. No.: WO2014/041100
PCT Pub. Date: Mar. 20, 2014

(65) Prior Publication Data
US 2015/0226357 A1    Aug. 13, 2015

(30) Foreign Application Priority Data
Sep. 13, 2012 (DE) .................. 10 2012 018 069

(51) Int. Cl.
*F16L 53/38*    (2018.01)
*F16L 21/00*    (2006.01)
(Continued)

(52) U.S. Cl.
CPC ............. *F16L 21/002* (2013.01); *F16L 13/02* (2013.01); *F16L 13/103* (2013.01);
(Continued)

(58) Field of Classification Search
CPC ..... F16L 13/0245; F16L 13/10; F16L 13/103; F16L 13/11; F16L 13/141; F16L 13/161; F16L 21/002; F16L 53/008; F16L 53/38
(Continued)

(56) References Cited

U.S. PATENT DOCUMENTS 3,777,354 A * 12/1973 Masters .................. B25B 27/10
                                                         285/256
3,788,938 A     1/1974 Wise
(Continued)

FOREIGN PATENT DOCUMENTS

DE    19741641 A1    3/1999
DE    69912943 T2    9/2004
(Continued)

*Primary Examiner* — Aaron M Dunwoody
(74) *Attorney, Agent, or Firm* — Seth L. Hudson; Clements Bernard Walker, PLLC

(57) ABSTRACT

The invention relates to a device (1) for connecting two fluid-channeling lines (10, 20), wherein the device has a through-bore (2) for advancing the fluid and two opposite line mounts (11, 21), which terminate at a predetermined distance (4) from one another within the device. Each of these line mounts (11, 21) is designed such that it is provided with a first part (12, 22), through which the through-bore (2) leads, and a second part (13, 23), which enclosed the first part (12, 22), an annular space (14, 24) therefore being formed between the first part (12, 22) and the second part (13, 23). Each of the two fluid-channeling lines, (10, 20) is arranged in one of the line mounts (11, 21) such that it has an inner cross section (16, 26) arranged, and fixed, with sealing action against the first part (12, 22) of the device and has an outer cross section (17, 27) arranged, and fixed, in the annular space (14, 24).

12 Claims, 2 Drawing Sheets

(51) Int. Cl.
*F16L 13/02* (2006.01)
*F16L 13/10* (2006.01)
*F16L 13/14* (2006.01)
*F16L 57/00* (2006.01)
*F16L 53/34* (2018.01)

(52) U.S. Cl.
CPC ............. *F16L 13/141* (2013.01); *F16L 53/34* (2018.01); *F16L 53/38* (2018.01); *F16L 57/00* (2013.01)

(58) Field of Classification Search
USPC ..... 285/41, 288.2, 288.3, 288.4, 288.5, 398, 285/915, 22, 21.1, 21.2, 21.3
See application file for complete search history.

(56) References Cited

U.S. PATENT DOCUMENTS

| | | | | |
|---|---|---|---|---|
| 4,053,247 A * | 10/1977 | Marsh, Jr. | ............. | F16L 13/147 285/148.23 |
| 4,281,862 A * | 8/1981 | Ridenour | ............... | B21D 39/04 285/382.2 |
| 4,457,542 A * | 7/1984 | Shaefer | ................. | F16L 43/008 156/172 |
| 4,514,244 A * | 4/1985 | Shaefer | ................. | F16L 43/008 156/158 |
| 4,998,337 A * | 3/1991 | Tiekink | ............. | B29C 45/14614 138/149 |
| 5,135,267 A * | 8/1992 | Wilson | ................. | F16L 13/141 285/148.13 |
| 5,143,407 A * | 9/1992 | Cokeh | ................... | B29C 66/636 285/331 |
| 5,150,922 A * | 9/1992 | Nakashiba | ............ | B29C 65/342 219/535 |
| 5,504,308 A * | 4/1996 | Shiozaki | ............... | B29B 13/024 156/274.2 |
| 5,752,725 A * | 5/1998 | El-Sobky | ............ | B29C 65/0672 228/114.5 |
| 6,494,501 B2 * | 12/2002 | Gotoh | ................... | F16L 13/103 285/21.3 |
| 6,761,187 B1 * | 7/2004 | Zoellner | ............. | B29C 37/0085 138/155 |
| 6,857,670 B2 * | 2/2005 | Fritze | ..................... | B29C 57/00 285/21.1 |
| 7,222,886 B2 * | 5/2007 | Kim | ....................... | F16L 47/32 285/133.11 |
| 8,109,688 B2 * | 2/2012 | Hattass | .................. | B23K 20/12 285/288.1 |
| 8,591,241 B2 * | 11/2013 | Rosenfeldt | ............... | H05B 3/40 285/41 |
| 9,027,966 B2 * | 5/2015 | Altmann | ................ | F16L 13/143 285/242 |
| 9,194,518 B2 * | 11/2015 | Chaloupka | .............. | F16L 33/34 |
| 2002/0058436 A1 | 5/2002 | Saba | | |
| 2009/0021002 A1 | 1/2009 | Decarlo | | |
| 2013/0234430 A1 * | 9/2013 | Van Der Donk | ....... | B29C 65/20 285/21.1 |
| 2014/0375047 A1 * | 12/2014 | Jones | ..................... | F16L 47/03 285/21.1 |

FOREIGN PATENT DOCUMENTS

| | | |
|---|---|---|
| DE | 10 2004 046 797 A1 | 4/2006 |
| DE | 20 2007 010 502 U1 | 11/2008 |
| DE | 202009003807 U1 | 8/2010 |
| DE | 10 2010 010 765 A1 | 9/2011 |
| EP | 0312758 A1 | 4/1989 |
| EP | 0379635 A1 | 8/1990 |
| EP | 465419 A1 * | 1/1992 |
| WO | 2009/080501 A1 | 7/2009 |

\* cited by examiner

DEVICE FOR CONNECTING TWO FLUID-CONDUCTING LINES

FIELD OF THE INVENTION

The invention relates to a device for connecting two fluid-conducting lines to one another.

BACKGROUND OF THE INVENTION

German utility model DE 1 732 279 U1 discloses a connection between two fluid-conducting lines, to be more precise a connecting element for connecting two housing hoses. The connecting element is embodied as a single-piece component through which a continuous drilled hole leads and which is provided at its outer side with a thread which is embodied in opposite directions, with the result that two garden hoses can easily be connected to one another by screwing onto the thread, and disconnected again from one another.

In addition, European Patent EP 2 035 737 B1 discloses a sleeve for connecting two pipes which are each embodied with a connecting collar. The sleeve can be fitted here over the connecting collars of the pipes to be connected and can be fastened against unintentional removal by a locking device against unintentional removal, but can be removed again relatively easily.

In the utility vehicle and automobile industry, fluid-conducting lines are used to transport, for example, urea-water mixtures for environmentally friendly exhaust gas purification. Since the lines which conduct these urea-water mixtures have to be heated, the electric contacts are typically arranged in the region of a hose coupling (connector). Furthermore, in the utility vehicle and automobile industry it is necessary to operate in a cost-effective way with a design which is as compact as possible so that lines for urea-water mixtures should be capable of being manufactured as conveniently as possible. These lines must meet all the applicable regulations relating to media-resistance, leak proofness or temperature-resistance.

SUMMARY OF THE INVENTION

The object of the invention is to make available an improved device for connecting two fluid-conducting lines, specifically for application in the field of the utility vehicle and automobile industry, and particularly preferably for lines which conduct urea-water mixtures. This object is achieved by means of the features of claim 1. A housing which can be used, in particular for a device according to the invention is specified in claim 15. Advantageous refinements of the invention are specified in the dependent claims.

The inventive solution provides that a device for connecting two fluid-conducting lines has a continuous drilled hole for passing on the fluid, wherein the device has two line receptacles which lie opposite one another and which end at a specific distance from one another within the device. Each of the line receptacles lying opposite one another is embodied in such a way that it is provided with a first part through which the continuous drilled hole leads, and a second part which surrounds the first part, with the result that an annular space whose floor defines the end of the respective line receptacle is formed between the first part and the second part. The first of the fluid-conducting lines is arranged in one of the line receptacles in such a way that it is arranged with an inner cross section in a seal-forming fashion against the first part of the device and with an outer cross section in the annular space and is secured there. The second of the fluid-conducting lines is arranged in the other of the line receptacles in such a way that it is arranged with an inner cross section in a seal-forming fashion against the first part of the device and with an outer cross section in the annular space and is secured there.

As a result of this device, a compact reliable and cost-effective connection of two lines which conduct fluid, preferably a urea-water mixture. Furthermore, an additional detachable intermediate connection such as, for example, a sleeve is required as a result of which a certain degree of unreliability arises in terms of the leakproofness.

The device is preferably embodied in such a way that each of the fluid-conducting lines is secured by means of an adhesive which at least partially fills in the annular space. Preferably in this context at least one spacer element is formed on the floor of at the bottom of each of the spacers of each of the annular spacers, which spacer element forms a stop, spaced apart from the bottom for the end of each of the lines. This arrangement ensures sealed enclosure and therefore, owing to the large adhesive surfaces which are made available at the end sides and the lateral side particular reliable securement of the lines with respect to the drilled hole which passes through, and a compact design is also made possible. As an alternative to a connection by means of adhesion, the device is preferably embodied in such a way that each of the fluid-conducting lines is secured in the annular space by means of friction welding, ultrasonic welding or laser welding. The advantage of a welding method for securing the lines is that such a method permits rapid and cost-effective manufacture of the device. The satisfactory positioning of the line ends before the welding is ensured by their arrangement in the annular spaces.

According to a further alternative, the device is preferably embodied in such a way that each of the fluid-conducting lines is connected to the second part by means of a crimped connection. The advantage of the crimping method is that a cost-effective mechanical connection can be produced relatively quickly between the lines and the device. For the provision of a crimped connection, the length of the outer second part of the line receptacles with respect to the inner first part thereof is correspondingly reduced.

The device is preferably embodied in such a way that the line is formed by a hose. A hose has the advantage over a line that it has a certain degree of flexibility and therefore simpler and more flexible laying is possible.

The fluid in each of the lines is preferably formed by a urea-water mixture, as a result of which the device can be used in the utility vehicle and automobile industry.

The device is preferably embodied in such a way that the fluid-conducting lines can be heated. This has the advantage that the lines can be used for fluids with which the undershooting of a predetermined temperature is not desired, and therefore heating of the lines is necessary.

The device is preferably embodied in such a way that at least two heating circuits are made available. The actuation or the power control of each of the heating circuits is carried out by means of at least one temperature sensor. In one advantageous embodiment, the heating circuit, for example in the form of heating wires, heating foils or heating mats, are arranged on or in each fluid-conducting line, secured there and electrical contact is made with them outside the device or there connected to one another. In addition, a jacket is made available around the contacts or the connecting points of the heating circuits. The advantage of making available at least two heating circuits is that by activating these heating circuits differently it is possible to make available a separate power control means and therefore an individual heating temperature in the individual lines or line sections, with the result that the device can be used in different application ranges.

For this purpose, the first of the fluid-conducting lines can advantageously be used in a relatively high temperature range T1 of, for example, −40° C.<T1≤200° C. and the second of the fluid-conducting lines can be used in a relatively low temperature range T2 of, for example, −40° C.<T2≤120° C. These temperature ranges are, for example, typical of application in an automobile or utility vehicle if, for example, one line is used in an area near to an engine and the other line is used in an area which is not to an engine.

Each of the fluid-conducting lines is advantageously manufactured at least partially from a different material in order to meet the temperature conditions and permit more cost-effective manufacture.

The device according to the invention is particularly preferably located in a housing and is preferably a closable cover which is formed thereon or arranged thereon, and has in its longitudinal direction two openings which lie opposite one another and through which in each case one of the fluid-conducting lines is guided.

In addition, on the openings of the housing a connecting element is preferably made available which is configured to connect a guide device for each of the fluid-conducting lines to the housing. This housing ensures that the device is sealed off in a closed fashion against environmental influences which is important in particular in the utility vehicle and automobile industry, since demanding requirements are made of the individual components (specifications, standards etc.).

In one preferred embodiment, the housing has a recess for receiving a control circuit board. As a result of the integration of a control circuit board, an even more compact design for an individual heating power controller of the connected lines or line sections is made possible. Fewer individual elements are required for the manufacture, which provides a further cost saving.

BRIEF DESCRIPTION OF THE DRAWINGS

An exemplary embodiment of a device according to the invention for connecting two-fluid-conducting lines is explained in more detail below with reference to the drawings. Identical reference symbols in the various figures denote the same elements here. In the drawings.

DESCRIPTION OF THE PREFERRED EMBODIMENT

Figure 1:
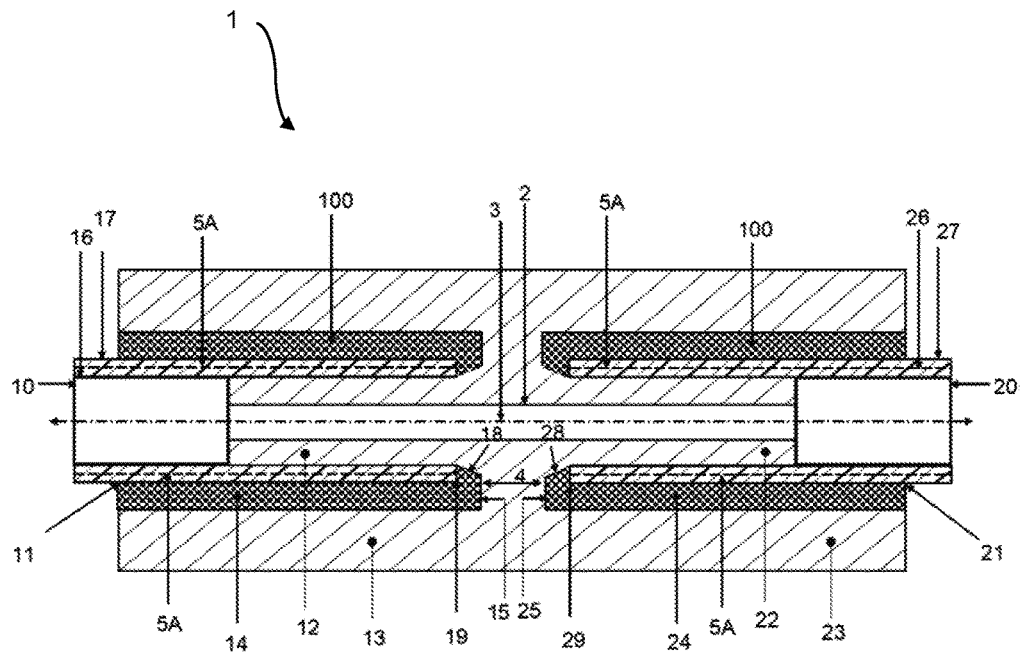
FIG. 1 shows a schematic view of an embodiment of the device according to the invention.

FIG. 1 is a schematic illustration of a first exemplary embodiment of a device 1 according to the invention. The device 1 is penetrated in the direction of its longitudinal axis by a continuous drilled hole 2, with the device 1 has an opening at it respective ends in the direction of the longitudinal axis 3. However, in contrast to the illustration in the figures, an angled device, in which the longitudinal axis within the device is bent or curved, and as a result experiences a change in angle of, for example, 90° C. is also possible.

A line receptacle (21) is provided at each of the ends of the device, each of which line receptacles 11, 21 can receive a fluid-conducting line 10, 20. The one line receptacle 11 ends within the device 1 at a predetermined distance 4 from the other line receptacle 21, with the result that, apart from the continuous drilled hole 2, there is no fluid connection between the line receptacles 11 and 21.

The line receptacles 11, 21 are embodied in such a way that they each have a first part 12, 22, through which the continuous bore 2 leads, and a second part 13, 23, which surrounds the first part 12, 22, with the result that in each case an angular space 14, 24 is formed between the first part 12, 22 and the second part 13, 23. The bottom 15, 25 of the respective line receptacle 11, 21 defines the end of the corresponding line receptacle 11, 21. The two fluid-conducting lines 10, 20 are each formed in FIG. 1 by whose inner passage is bounded by a wall with an inner cross section 16, 26 and an outer cross section 17, 27.

The respective hose 10, 20 is arranged here in the line receptacle 11, 21 in such a way that its inner cross section 16, 26 is arranged in a seal-forming fashion against the first end 12, 22 and its outer cross section 17, 27 is arranged in the annular space 14, 24 and is secured therein. The continuous bore 2 therefore leads from one end of the device 1 to the other end of the device 1 (in the direction of its longitudinal axis 3) and therefore connects two lines or hoses 10, 20 to one another without in the process adversely affecting the through flow fluid. The two lines 10, 20 are arranged here in the device 1 in such a way that they form a sealed connection therewith.

In order to permit a particularly strong connection, the outer cross section 17, 27 of each hose 10, 20 is secured in the respective annular space 14, 24 by means of an adhesive 100 which at least partially fills in the annular space 14, 24. For this purpose, a material of the lines 10, 20 must be selected which is suitable for the adhesion and the corresponding adhesive 100, and the adhesive 100 must be selected in accordance with the material used for the lines 10, 20. When adhesive 100 is used for securing, the respective annular space 14, 24 has, towards its bottom 15, 25 a spacer element 18, 28, preferably in the form of an annular slope which widens toward the bottom 15, 25. The respective line or the hose 10, 20 is pushed in the form of a tight fit over the corresponding part 12, 22 in each case, and then abuts with its end 19, 29 in each case against the corresponding spacer element 18, 28, with the result that a distance is produced between the end of the hose 19, 29 and the bottom 15, 25 of the annular space 14, 24 as a result of which the adhesive 100 also secures the respective line 10, 20 at the end side from the side of the bottom 15, 25.

Figure 2:
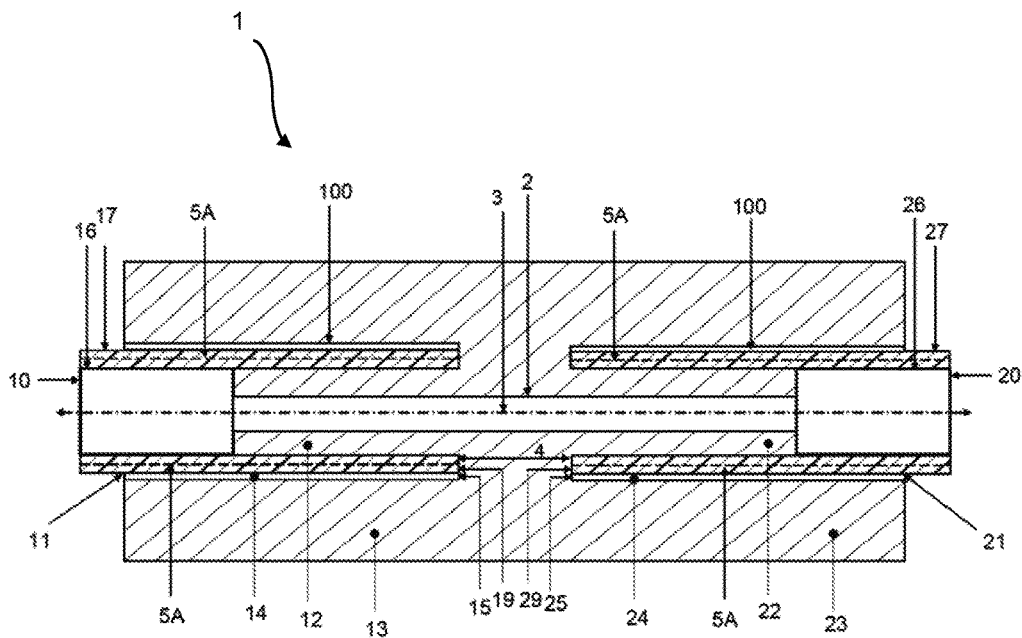
FIG. 2 shows a schematic view of a further embodiment of the device according to the invention.

The device 1 which is illustrated in FIG. 2 corresponds essentially to the device 1 which is illustrated in FIG. 1 (with the same reference symbols). The only structural difference is that there is no spacer element as in FIG. 1. This is because in methods such as friction welding, laser welding or ultrasonic welding or also in the case of a crimping method the line 10, 20 should abut as far as possible against the bottom 15, 25 of the line receptacle 11, 25 and should have an annular space 14, 24 which is as small as possible so that these methods can be used effectively. In the case of friction welding, the heat is generated by a relative rotational movement of the device 1 and the lines 10 and 20, even essentially at the end sides, as frictional heat between the bottom 15, 25 of the annular space 14, 24 and the end 19, 29 of the lines 10 and 20.

If methods such as friction welding, laser welding or ultrasonic welding are used to secure the lines 10, 20, the materials of the lines 10, 20 must be composed, like the material of the first part 12, 22 and of the second part 13, 23, from material which is suitable for the respective method.

In the case of friction welding, two parts which are in contact with one another at contact faces are moved relative to one another. As a result of the friction which occurs, the two parts heat up and are plastified, that is to say change from a solid state into a deformable or fluid state. In order to provide a fixed connection between the parts, they must be placed in the desired position at the end of the friction welding process and a pressure must be applied thereto. Suitable materials are, for example thermoplasts. Ultrasonic welding forms part of the field of friction welding and is a method in which thermoplasts are connected, wherein the required heat is provided by high frequency mechanical oscillation (ultrasound). In order to apply the friction welding method (including ultrasonic welding) for the device 1 according to the invention, the materials of the respective line, 10 20 and of the respective first part 12, 22 are selected in such a way that they can be placed, by rotating relative to one another and/or by ultrasound, in a state which permits them to be connected to one another.

The laser welding method is used in particular for welding components which have to be welded together quickly and with which a small and narrow welding seam is required. In the case of laser welding, the laser beam is focused by means of optics. The absorption of the laser power on the surface of the material to be welded results in a very rapid rise in the temperature, so that a melt forms. In order to apply the laser welding method for the device 1 according to the invention, the respective second part 13, 23 must be composed of a material which is permeable to laser beams to such an extent that the respective line 10, 20 can as a result be secured to the respective first part 12, 22.

Crimping is a method in which two parts are connected to one another by mechanical or plastic deformation, wherein an homogeneous connection which is difficult to disconnect and which is electrically and mechanically very reliable is produced. In order to apply this method for the device 1 according to the invention, suitable materials must be correspondingly used in each case for the respective line 10, 20 and the first and second parts 12, 13, 22, 23.

The exemplary embodiments described above have in common the fact that the lines 10, 20 can be heated. This can be done, for example, by means of a heating circuit 5 with heating wires 5A which are wound around the respective line 10, 20 and secured thereto. In order to bring about selective control of the heating power, two or more heating circuits can be made available whose power is controlled, for example, by means of a control circuit board by evaluating specific parameters which are matched to the place and purpose of use and/or by evaluating at least one temperature signal of a temperature sensor. Each of the heating circuits 5 is secured on or in one of the two lines 10, 20 and be controlled separately. Use in various application ranges is therefore possible, for example in a first relatively high temperature range T1, in which the temperature is, for example, between 120° C. and 200° C., and in a second relatively low temperature range T2, in which the temperature is, for example in a range from 30° C. to 120° C. Such temperature ranges are customary, for example, given a line leading from an outer area into an inner area or from an area of a utility vehicle or an automobile which is near to the engine into a region of a utility vehicle or an automobile which remote from the engine. In this context, the lines which are suitable for the relatively high temperature range T1 are a rule significantly more expensive, for which reason the use of the device according to the invention has financial benefits in the form of a cost reduction in such relatively high quality lines are used only where they are also necessary owing to the requirements, while in the other areas more cost-effective lines are used.

In the device 1 according to the invention, the heating circuits 5 are connected to one another on the outside of the device 1. For this purpose they are led outward from the lines 10, 20 in the region of the connecting points are connected to one another by means of suitable contacts 7 or are connected to the contacts 260 of a control device, for example in the form of a control circuit board 250 (illustrated in FIG. 4). This connecting point to the contacts 7 is advantageously provided with a jacket 6 which protects the connecting point against environmental influences, with the result that a reliable electrical connection is ensured.

Figure 3:
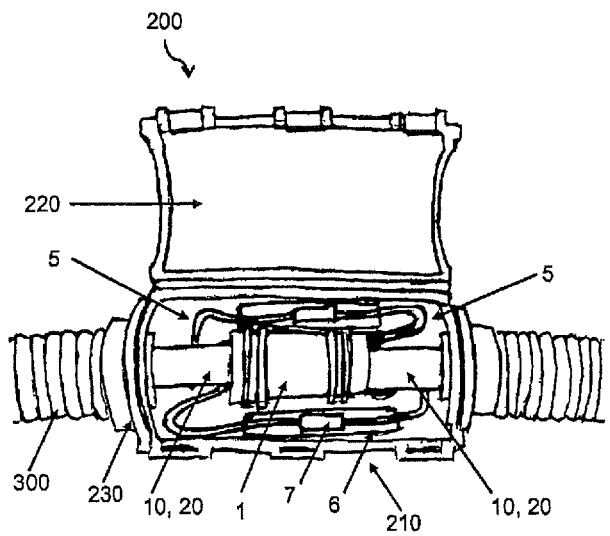
FIG. 3 shows a schematic view of a housing according to the invention with the device according to the invention arranged therein.
Figure 4:
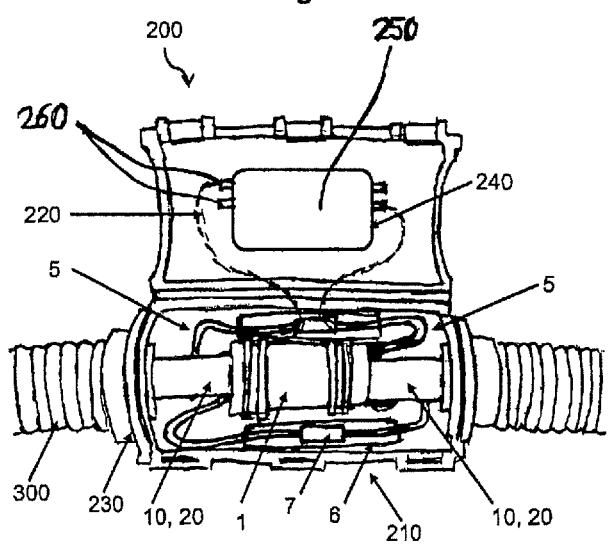
FIG. 4 shows a schematic view of a housing according to the invention with a recess for a control circuit board.

The device 1 according to the invention is advantageously arranged, as illustrated in FIGS. 3 and 4 in a housing 200 which is formed in a closable fashion from a base body 210 and a cover 220 which is formed thereon in one piece (for example with a film hinge) or arranged thereon. The cover 220 can also be attached in a foldable fashion to the base body 210 and connected thereto or attached thereto by means of a latching-in mechanism, as shown in FIG. 3, for example. Other embodiments of the housing 200 are also possible as long as the housing 200 can be opened so that the device 1 can be reached in order to install it there, for example.

The housing 200 has, at its ends in the direction of its longitudinal axis, two openings through which the respective lines 10, 20 can be led. For this purpose, for example connecting elements 230 can be made available which a connection between a guide device 300, in which the lines 10, 20 are guided and protected against environmental influences, and the housing 200. The guide device 300 can be embodied, for example, in the form of a bushing which surrounds the hose ends in a sealed fashion and which engages with an outwardly protruding flange into a corresponding annular groove of the housing 200. The annular grooves form the connecting elements 230 in this case. The material of the housing should satisfy the specifications of the automobile industry with respect to leak proofness, media-resistance and heat-resistance etc.

The housing 200 advantageously has a recess 240, for example on its cover 220, as illustrated schematically in FIG. 4 in order to receive therein a control circuit board 250 for controlling the heating circuits 5 or other functionalities. The control circuit board 250 is provided with a plurality of contacts 260 for connecting to the heating circuits 5.

By means of the device 1 according to the invention for connecting two fluid-conducting lines to one another and the housing 200 according to the invention it is possible to connect two different lines 10, 20 to one another in a sealed and compact fashion by means of a single component. In addition, the inventive arrangement of the heating circuits 5 permits the temperature of the respective lines 10, 20 to be controlled separately in a simple way.

LIST OF REFERENCE SYMBOLS

1 Device
2 (Continuous) drilled hole

3 Longitudinal axis
4 Distance (between the line receptacles)
5A Heating Wire
6 Jacket
7 Contact (for heating circuit)
10, 20 Line or hose
11, 21 Line receptacle
12, 22 First part of (of 11, 21)
13, 23 Second part (of 11, 21)
14, 24 Annular space
15, 25 Bottom of the annular space
16, 26 Inner cross section (of 10 and 20)
17, 27 Outer cross section (of 10 and 20)
18, 28 Spacer element
19, 29 End (of 10 and 20)
100 Adhesive
200 Housing
210 Base body
220 Cover
230 Connecting element
240 Recess
250 Control circuit board
260 Contact (on 250)
300 Guide device
T1 (Relatively high) temperature range
T2 (Relatively low) temperature range.

The invention claimed is:

1. A device (1) for connecting two fluid-conducting lines (10, 20) having a first end and a second end, wherein the device (1) has a continuous drilled hole (2) that leads from one end of the device to the other end of the device for passing on the fluid, characterized in that the device (1) has two line receptacles (11, 21) lying opposite one another in the direction of a longitudinal axis (3), which line receptacles (11, 21) end at a distance (4) from one another within the device (1), wherein each of the line receptacles (11, 21) lying opposite one another is embodied in such a way that each line receptacle (11, 21) is provided with a first part (12, 22) through which the continuous drilled hole (2) leads, and a second part (13, 23) which surrounds the first part (12, 22), with the result that an annular space (14, 24) whose bottom (15, 25) defines the end of the respective line receptacle (11, 21) is formed between the first part (12, 22) and the second part (13, 23), and a first of the fluid-conducting lines (10, 20) is arranged in one of the line receptacles (11, 21) in such a way that the first of the fluid-conducting lines (10, 20) is arranged with an inner cross section (16, 26) in a seal-forming fashion against the first part (12, 22) of the device (1), and with an outer cross section (17, 27) in the annular space (14, 24) and is secured there and not contacting the second part, and a second of the fluid-conducting lines (10, 20) is arranged in the other of the line receptacles (11, 21) in such a way that it is arranged with an inner cross section (16, 26) in a seal-forming fashion against the first part (12, 22) of the device (1) and with an outer cross section (17, 27) in the annular space (14, 24) and is secured there and not contacting the second part, characterized in that the first of the fluid-conducting lines (10, 20) is designed for use in a relatively high temperature range T2, and in that each of the fluid-conducting lines (10, 20) is manufactured at least partially from a different material, wherein the two different lines (10,20) are connected in a sealed and compact fashion by a single component and a heating wire is wound around each fluid conducting line (10, 20).

2. The device as claimed in claim 1, characterized in that each of the fluid-conducting lines (10, 20) is secured to the device (1) by means of an adhesive (100) which at least partially fills the annular space (14, 24).

3. The device as claimed in claim 2, characterized in that at least one spacer element (18, 28) is formed at the bottom (15, 25) of each of the annular spaces (14, 24), which spacer element (18, 28) has the form of an annular slope that widens toward the bottom of each of the annular spaces (14, 24) and forms a stop, spaced apart from the bottom (15, 25) for the end (19, 29) of each of the lines (10, 20).

4. The device as claimed in claim 1, characterized in that each of the lines (10, 20) is formed by a hose.

5. The device as claimed in claim 1, characterized in that the fluid-conducting lines (10, 20) can be heated.

6. The device as claimed in claim 5, characterized in that at least two heating circuits (5) are provided.

7. The device as claimed in claim 6, characterized in that the control of a power of each of the heating circuits (5) is carried out by means of a temperature sensor.

8. The device as claimed in claim 6, characterized in that the heating circuits (5) are formed by a heating wire (5A) which is arranged in each of the fluid-conducting lines (10, 20) and secured there, and contact is made with them outside the device (1) by means of electrical contacts (7).

9. The device as claimed in claim 8, wherein a jacket (6) is provided around the contacts (7) of the heating circuits (5).

10. The device (1) for connecting two fluid-conducting lines (10, 20) as claimed in claim 1, having a housing (200) which is formed from a base body (210) and a cover (220) which is formed thereon or is attachable thereto and has in the longitudinal direction two openings which lie opposite one another and through which in each case one of the fluid-conducting lines (10, 20) is guided.

11. A housing as claimed in claim 10, characterized in that at the openings of the housing (200) a connecting element (230) is made available which is configured to connect a guide device (300) for each of the fluid-conducting lines (10, 20) to the housing (200).

12. The housing as claimed in claim 10, characterized in that said housing has a recess (240) for receiving a control circuit board (250).

* * * * *

UNITED STATES PATENT AND TRADEMARK OFFICE
CERTIFICATE OF CORRECTION

PATENT NO. : 10,113,675 B2
APPLICATION NO. : 14/428309
DATED : October 30, 2018
INVENTOR(S) : Puskas et al.

It is certified that error appears in the above-identified patent and that said Letters Patent is hereby corrected as shown below:

On the Title Page

Column 1, item (30) Foreign Application Priority Data:
Change "Sept 13, 2012 (DE) ..................... 10 2012 018 069" to Sept 13, 2012 (DE) 10 2012 018 069.1

Signed and Sealed this
Twenty-second Day of January, 2019

Andrei Iancu
*Director of the United States Patent and Trademark Office*